(12) United States Patent
Sacks et al.

(10) Patent No.: US 6,600,426 B1
(45) Date of Patent: Jul. 29, 2003

(54) ALARM SYSTEM FOR DETECTING HAZARDS DUE TO POWER TRANSMISSION LINES

(75) Inventors: H. Kenneth Sacks, McMurray, PA (US); Michael R. Yenchek, Bethel Park, PA (US); Gerald T. Homce, Pittsburgh, PA (US); James C. Cawley, Venetia, PA (US)

(73) Assignee: The United States of America as represented by the Department of Health and Human Services, Washington, DC (US)

( * ) Notice: Subject to any disclaimer, the term of this patent is extended or adjusted under 35 U.S.C. 154(b) by 80 days.

(21) Appl. No.: 09/669,435

(22) Filed: Sep. 25, 2000

Related U.S. Application Data

(60) Provisional application No. 60/157,575, filed on Oct. 4, 1999.

(51) Int. Cl.$^7$ ................................................ G08B 21/00
(52) U.S. Cl. ........................ 340/664; 340/684; 340/685
(58) Field of Search ................................. 340/664, 684, 340/685, 662, 687, 654, 649

(56) References Cited

U.S. PATENT DOCUMENTS

| | | |
|---|---|---|
| 3,745,549 A | 7/1973 | Jepperson et al. |
| 3,786,468 A | 1/1974 | Moffitt |
| 4,649,375 A | 3/1987 | Duppong et al. |
| 4,675,664 A | 6/1987 | Cloutier et al. |
| 5,001,465 A | 3/1991 | Siegel |
| 5,276,426 A | 1/1994 | LoBello |
| 5,684,466 A | * 11/1997 | Keating et al. ............. 340/664 |
| 6,091,337 A | * 7/2000 | Arshad et al. .............. 340/662 |
| 6,124,798 A | * 9/2000 | Tai et al. .................... 340/685 |

FOREIGN PATENT DOCUMENTS

JP          08182136 A    * 7/1996

* cited by examiner

*Primary Examiner*—Benjamin C. Lee
(74) *Attorney, Agent, or Firm*—Klarquist Sparkman LLP

(57) ABSTRACT

An alarm system for detecting and warning of the risk of shock and electrocution is provided. The alarm system is adapted for use with mobile construction equipment, e.g., cranes, trucks, etc., that can be used around overhead power transmission lines. The present alarm system has a sensor that detects the presence of outside power at the equipment where current is flowing therethrough to ground. The sensor preferably includes a conductor and an inductive sensor such as a current transformer which limits the output signal on its low side that is sent to an alarm unit. In this manner, the system herein continues to properly function despite the presence of large voltages at the equipment such as when the equipment contacts a high voltage power transmission line. The sensor can include a cable that provides a path of least resistance for current flowing through the equipment which can be detected by the sensor. Preferably, the cable is attached across a moving joint of the equipment where potential differences readily can be found. Alternatively, the conductor can be a portion of the equipment itself through which current flows with the sensor detecting the flow through the equipment portion.

30 Claims, 5 Drawing Sheets

| $V_{secondary}$ | $I_{total}$ | $I_{short}$ |
|---|---|---|
| 100 V | 25 mA | 16 mA |
| 200 V | 52 mA | 32 mA |
| 300 V | 77 mA | 48 mA |
| 400 V | 108 mA | 67 mA |
| 500 V | 139 mA | 87 mA |
| 600 V | 170 mA | 106 mA |
| 700 V | 198 mA | 123 mA |
| 800 V | 224 mA | 139 mA |
| 900 V | 252 mA | 156 mA |

ALARM SYSTEM FOR DETECTING HAZARDS DUE TO POWER TRANSMISSION LINES

This application claims benefit of 60/157,575 filed Oct. 4, 1999.

FIELD OF THE INVENTION

The invention relates to alarm systems and, more particularly, to an alarm system for mobile construction equipment to detect potential hazards due to overhead power transmission lines.

BACKGROUND OF THE INVENTION

Overhead electric power lines present a serious electrocution hazard to personnel in a variety of industries. Overhead lines, typically uninsulated conductors supported on towers or poles, are the most common means of electric power transmission and distribution, and are exposed to contact by mobile equipment such as cranes and trucks. Equipment contacting energized overhead lines becomes elevated to a high voltage, and simultaneous contact by personnel to the "hot" frame and ground can cause serious electrical shock and burns. Industries where risk of these accidents is greatest include construction, mining, agriculture, and communications/public utilities. An estimated 2300 accidental overhead line contacts occur each year in the U.S.

Construction activities present the most obvious potential for line contact accidents, and a recent study estimated that in 1993 alone, at least 26 electrocutions in this industry were a result of heavy equipment or hoisted loads contacting overhead lines. Mobile cranes (including boom trucks) were involved in most of these incidents (57%), with drill rigs (8%), dump bed trucks (7%), and manlifts (7%) also common. Detailed and more comprehensive statistics are available for the mining industry, which represents a smaller work force than the construction industry, but has a similar electrocution rate, and like construction uses heavy equipment extensively. From 1980 to 1997, at least 94 mobile equipment overhead line contact accidents were reported in the U.S. mining industry, with 114 injuries, 33% of them fatal. Most involved cranes (47%), dump bed trucks (24%), and drills (14%).

Proximity warning devices are known which purport to warn against impending contact with power lines. A significant shortcoming is that proximity warning devices are based only upon electrostatic field sensing which can fail to alarm reliably under certain configurations of multiple power line circuits. Other prevention techniques include de-energizing lines, maintaining appropriate distances from energized lines, use of an observer to warn the operator of impending contact, and barriers to prevent physical contact with an energized line. Oftentimes, however, these methods are not practical due to over-reliance on field personnel or because of the expense associated therewith. Another approach is the use of insulating links in the load line which attempts to prevent injury once contact has been made. However, surface contamination and moisture can reduce the insulation resistance of these insulating links and workers who contact parts of the equipment other than the load will not be protected.

Accordingly, there is a need for an alarm for mobile equipment that warns of the potential for electrocution without relying on sensing of power line electrostatic fields. A low cost and reliable alarm for warning personnel as to electrocution hazards would be desirable.

SUMMARY OF THE INVENTION

In accordance with the present invention, an alarm system is provided that utilizes a sensor for detecting power at the equipment which signals an alarm to warn of a potential shock or electrocution hazards when present. In this regard, the sensor does not rely upon detection of the power line electromagnetic field (emf), per se. Instead, the present invention detects the current flow on the equipment and signals its presence by causing or activating an alarm unit to warn of the potential hazard at the equipment.

In one form of the invention, an alarm system is provided for use with equipment of conductive material through which current can flow when electrical power is transmitted thereto. The alarm system includes a sensor for generating a signal in response to the presence of outside electrical power at the equipment due to current flow on the equipment. An alarm unit is provided for receiving the signal and providing one of a visual and audio indication that the electrical power is present. Because the present sensor signals the presence of current flow on the actual equipment and not the power line electrostatic or electromagnetic field, there is improved reliability as the functionality of the present invention does not depend on the configuration of the power lines.

The sensor can include a conductor with the signal from the sensor being generated in response to the presence of a predetermined amount of current flow through the conductor.

In one form, the conductor is attached to the equipment for establishing a path of least resistance to direct the current therethrough. The conductor can be a sensor cable that is easily welded or otherwise attached to the equipment to provide a low cost sensor of the present invention.

In another form, the sensor is an inductive sensor and the conductor is attached to the equipment with the inductive sensor detecting current flow through the conductor corresponding to the presence of a threshold level of potential on the conductor.

The inductive sensor can electrically isolate high levels of power at the equipment therefrom for ensuring the signal is generated despite the presence of the high power levels. In this manner, the present inductive sensor is well-suited for sensing power transmitted to the equipment from high voltage power transmission lines (e.g., 100,000 volts or more) minimizing the risk of sensor failure.

In one form, the conductor is attached to surfaces of the equipment that are adapted to move relative to each other.

The equipment may be provided in combination with the alarm system with the equipment being a mobile vehicle having moving portions that can engage overhead power lines such as when the vehicle is driven and/or as the portions are moved relative to each other for transmitting power to the portion of the vehicle in engagement with the power line and through other portions of the vehicle.

The sensor can include a conductor that is one of the portions of the vehicle with the signal being generated due to a predetermined current through one portion of the vehicle. In this manner, the present invention can be easily retrofit to the vehicle with a minimum of expense.

DETAILED DESCRIPTION OF THE PREFERRED EMBODIMENTS

Figure 1:
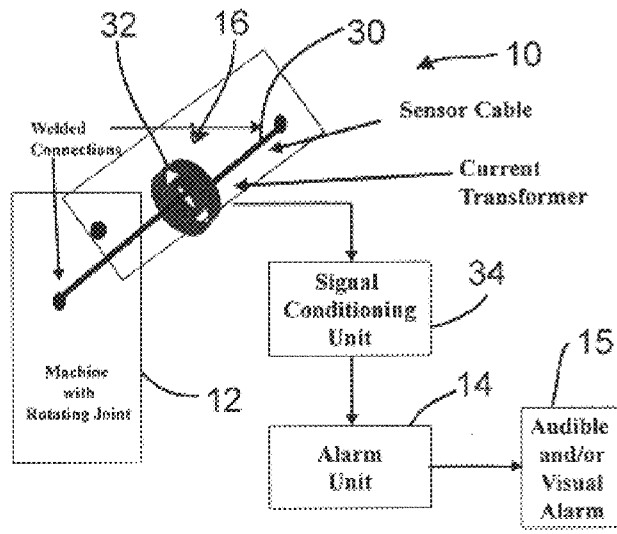
FIG. 1 is schematic view of an alarm system in accordance with the present invention including a sensor and alarm unit.

In FIG. 1, a schematic view of an alarm system 10 for equipment 12 of conductive material in accordance with the present invention is shown. The alarm system 10 includes an alarm unit 14 that provides an indication via an audible or visual alarm 15 that a potential shock or electrocution hazard exists at the equipment 12 due to the presence of outside electrical power. The alarm system 10 employs a sensor 16 which detects the outside power at the equipment such as due to current flow therethrough. Preferably, the sensor 16 only generates a signal to the alarm unit 14 when a predetermined threshold level of potential is present that would create a dangerous situation for those in contact with the equipment 12.

Figure 2:
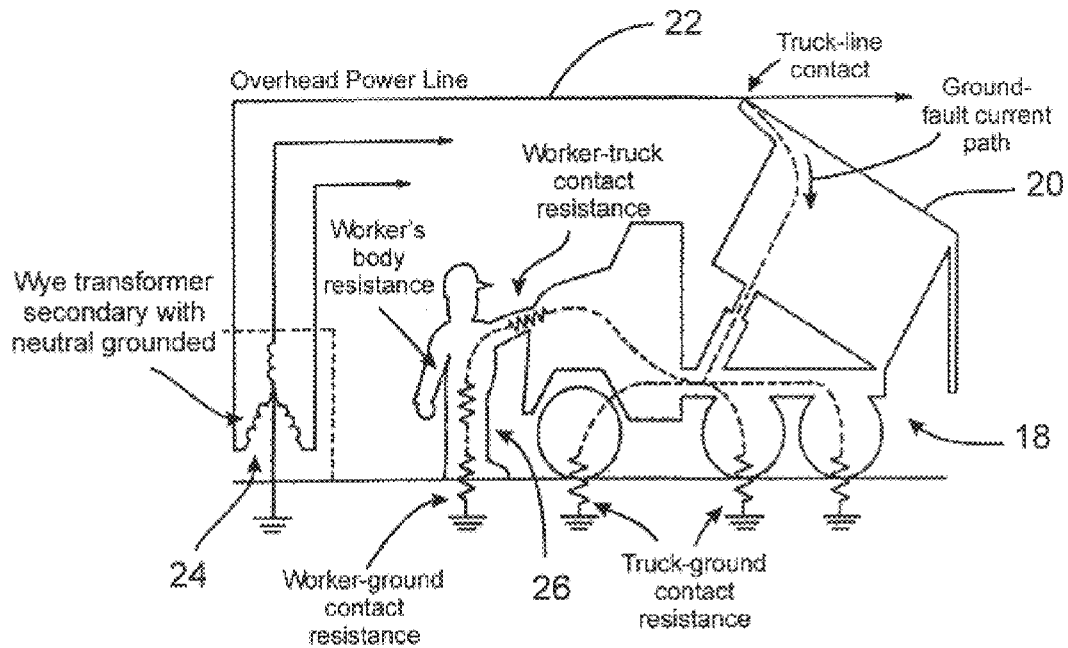
FIG. 2 is a schematic view of a vehicle in contact with an overhead power line with a worker touching the vehicle and the various current flows through the vehicle and worker.

FIG. 2 depicts the situation that can occur when the equipment 12 in the form of a mobile construction vehicle such as dump truck 18 has its rear bed 20 pivoted up so that it accidently comes into contact with a overhead high voltage power transmission line 22. In this instance, current can flow from the power line 22 through the vehicle 18 to earth, via the vehicle's ground contact, and back to the grounded point of a source transformer 24 feeding the lines 22. As shown, potentially dangerous current flows can occur through a worker 26 when touching such an energized or charged vehicle 18 providing another path for current flow to ground.

The present alarm system 10 is advantageous in that the sensor 16 thereof detects the above described condition of a vehicle 18 where the presence of outside electrical power such as from an overhead power transmission line 22 creates a dangerous situation for a worker 26 who gets too close and/or touches the vehicle 18. In this regard, the present alarm system 10 detects the presence of outside electric power on the equipment irrespective of how this condition occurs whether it be by engagement of a portion of the equipment 12 with the power line 22 or when the equipment portion comes into close proximity with the line 22 such that arcing can occur therebetween. In either case, the result is the same in that the equipment 12 can experience current flow therethrough which can lead to severe safety hazards for field personnel in contact therewith.

Figures 8, 9:
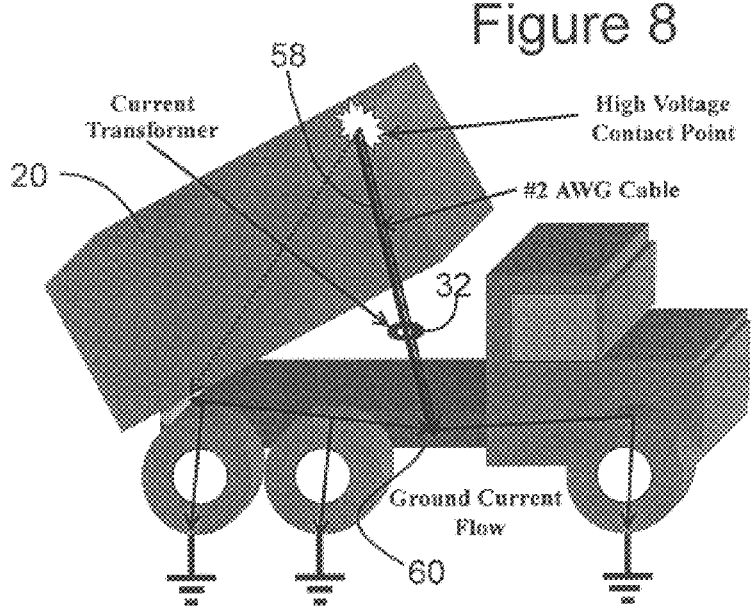
FIG. 8 is a schematic view similar to FIG. 7 showing the sensor cable extending between the truck frame and the pivoted bed.
FIG. 9 is a chart showing various applied voltages, and corresponding total current levels through the equipment and the shunt current levels through the conductor.

It has been found through extensive and carefully controlled field testing with dump trucks 18 and cranes 28 that when exposed to voltages at various points thereon, measurable currents flowed through the equipment 12 to remote ground without any special vehicle-to-ground contact. This was true at moderate voltages of less than 1,000 volts and ground resistivities from 6,000 to 100,000 ohm-cm, as shown in FIG. 9. Further, it was found that the equipment 12 was far from an equipotential surface and it was relatively easy to find points at different voltages, particularly on surfaces of vehicle portions that moved relative to each other.

To this end, the sensor 16 can include a conductor 30 attached to the equipment 12 so that currents can be measured by simply shunting to convenient points on the vehicle 12 and monitoring current flow with an inductive sensor 32 (FIG. 1). As shown in FIG. 9, the magnitude of the measured currents is sufficient to allow the use of a relatively inexpensive current transformer 32 for detecting the current flow in the conductor 30 and triggering a warning signal from the alarm unit 14.

The inductive sensor 32 is preferred over the direct measurement of potential differences or use of an ammeter for directly measuring current flow as it serves to electrically isolate the sensor 16 from the high levels of powers that can be at the equipment 12 such as due to high voltage power transmission lines 22. The current transformer 32 has a low output side which limits the signal sent to the circuit of the alarm unit 14 so as to protect the unit 14 from failure at the very moment it is needed.

The current transformer sensor 32 has coils in which an emf is induced when current flows through the conductor 30. Accordingly, even with relatively high power at the equipment 12, the current transformer 32 will operate to sense the current flow through the conductor 30 and limit its output signal on its low side for properly triggering the alarm unit 14. The output of the current transformer 32 can be a low-level AC current which is fed to a signal conditioning unit 34 which amplifies the signal and converts it to a signal suitable for triggering the alarm unit 14 as shown in FIG. 1. The circuitry for the signal conditioning unit 34 will in large part depend on the circuitry for the alarm unit 14. For example, the signal from the unit 34 can be a DC voltage that trips a relay for the alarm unit 14. The alarm 15 which can be a siren, bell, horn and/or light which operates as long as the equipment 12 is in its energized state such as due to contact with a high voltage source to provide a warning to the operator and bystanders.

Figure 3:
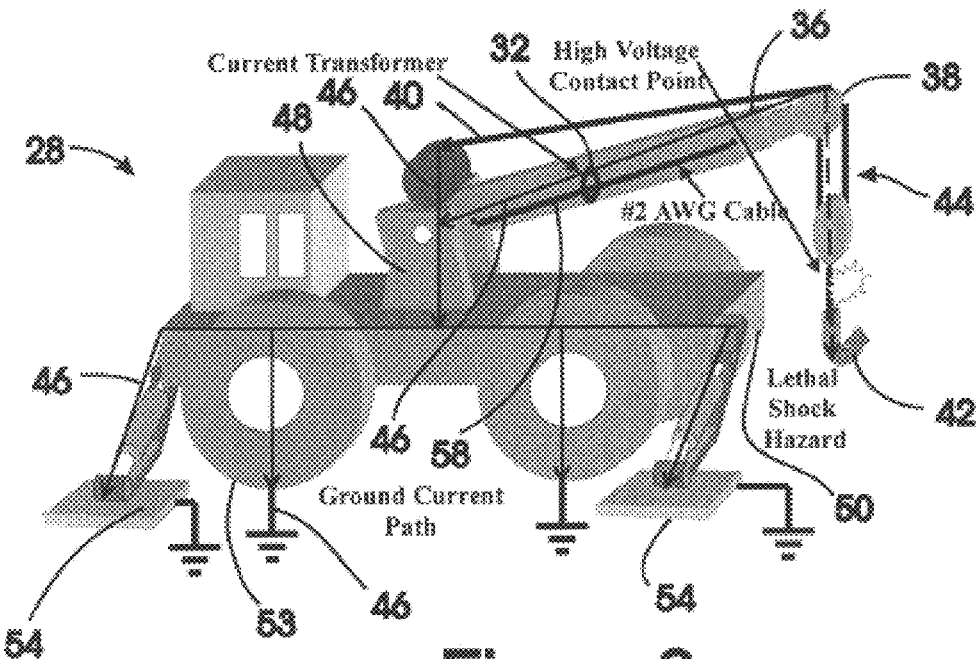
FIG. 3 is a schematic view of a crane with the sensor including a conductor and current transformer attached to a boom of the crane.

Referring next to FIGS. 3–8, the alarm system 10 is illustrated in various arrangements on mobile construction equipment 12 in the form of a dump truck 18 and crane 28. FIG. 3 shows the crane 28 including a pivotal boom 36 having a pulley 38 at its distal end over which a load cable 40 travels. The cable 40 such as in the form of a wire rope has a hook member 42 at the end thereof hanging from block and tackle arrangement 44 of which the pulley block 38 is a part. As will be appreciated, all these portions of the crane 28 can generally conduct electricity to a certain degree such that their engagement with high voltage power transmission lines 22 is to be avoided.

As shown in FIG. 3, the end of the wire rope 40 connecting to the hook member 42 has contacted a high voltage source such as the power transmission lines 22 so that current flows through the crane 28 as indicated by current flow vectors 46. Thus, current flows along the length of the boom 36 through trunnion mounts 48 which pivotally mount the boom 36 for being pivoted between lowered and raised positions. Current flows through the mounts 48 to the frame 50 of the crane and down to ground through tires 52 and hydraulically deployable steel stabilizers 54.

In the FIG. 3 arrangement, the alarm system 10 has a conductor 30 in the form of elongate cable 58 attached to the boom 36 so it extends along its length with the inductive current transformer sensor 32 disposed intermediate the ends of cable 58. The cable 58 is welded or otherwise attached to the boom 36 at the ends of the cable 58 so that there is an electrically conductive connection therebetween. The conductor cable 58 provides a path of least resistance so that a portion of the current flowing through the boom 36 will go through cable 58 and be detected by sensor 32 for signaling the alarm unit 14 that a dangerous condition exists at crane 28.

Figure 4A:
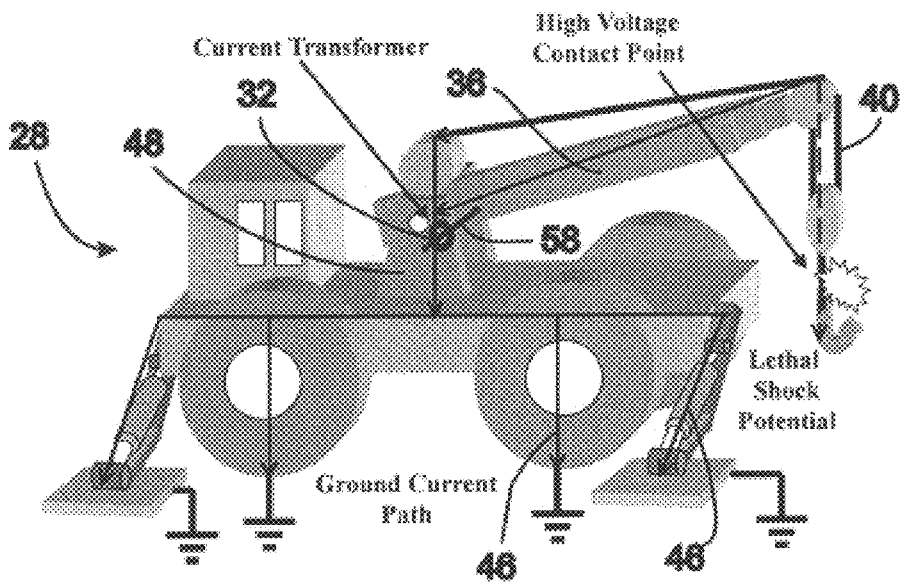
FIG. 4A is a schematic view similar to FIG. 3 showing the conductor attached between the boom and one of the crane trunnion mounts for the boom.
Figure 4B:
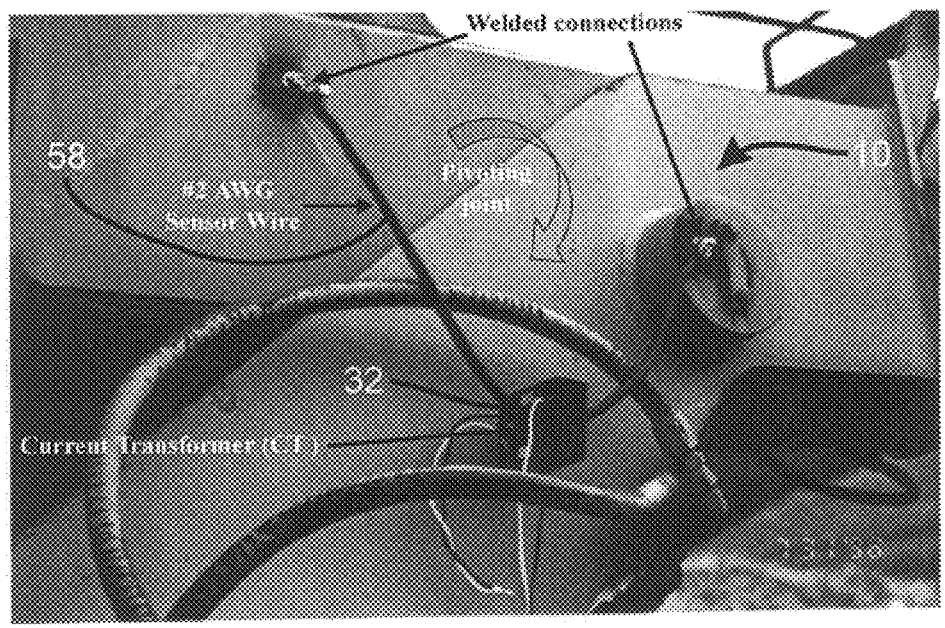
FIG. 4B is a photographic view similar to FIG. 4A showing the conductor welded at one end to the boom and at the other end to the trunnion mount and a current transformer intermediate the conductor ends.

FIG. 4A depicts the crane 28 as engaged with a high voltage source such as power transmission lines 22 at the end of the crane wire rope 40. The conductor cable 58 is welded across a moving joint with one end being fixed to the boom 36 and the other end to one of the trunnion mounts 48. As stated, it has been found that moving joints which are generally present on most mobile construction equipment 12 are especially good for generating potential differences therebetween. The sensor 32 detects the current flow through the cable 58 for signaling the alarm unit 14, as discussed. FIG. 4B shows the alarm system 10 attached to a crane 28 in the field with the sensor cable 58 attached across a moving joint and the current transformer 32 spliced between the ends of the cable 58.

Figure 5:
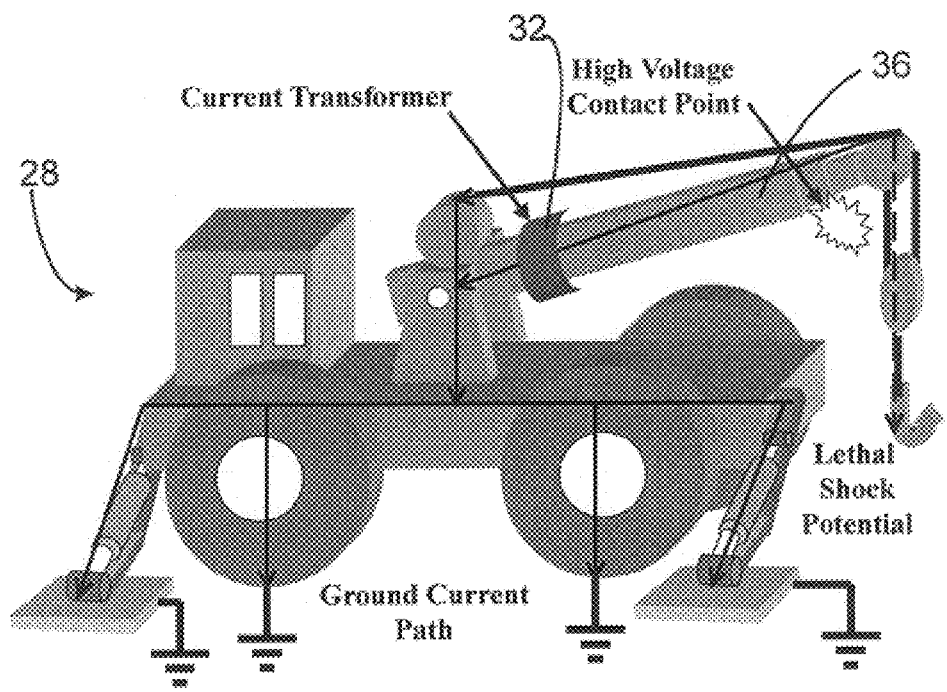
FIG. 5 is a schematic view of the crane showing the conductor in the form of the boom of the crane with the current transformer disposed thereabout.
Figure 6:
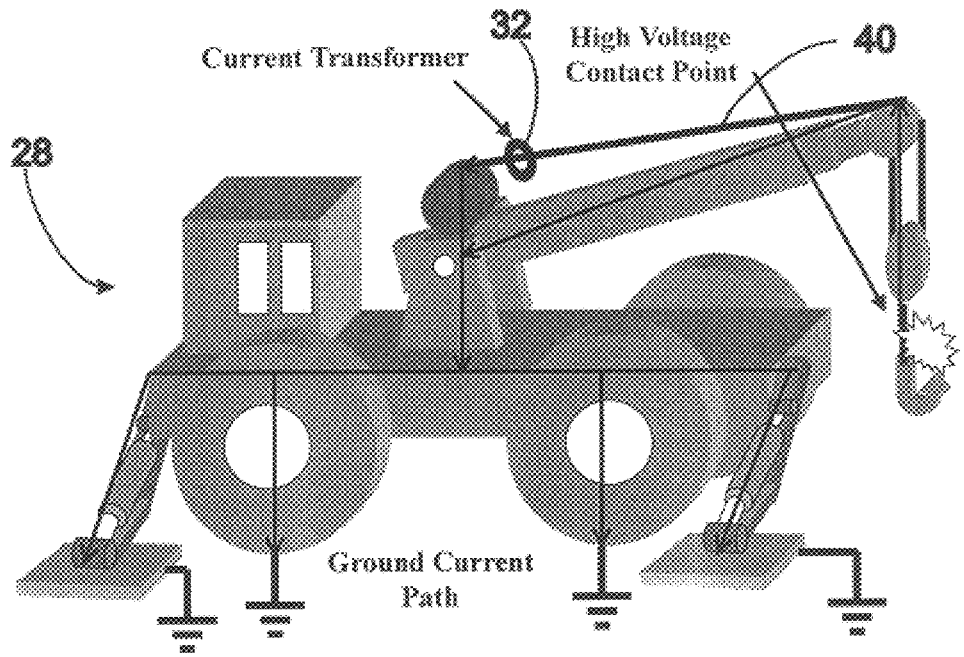
FIG. 6 is a view similar to FIG. 5 showing the conductor being a load cable of the crane.

FIGS. 5 and 6 illustrate the use of a portion of the crane 28 itself as a component of the sensor 16 for the alarm system 10 herein. FIG. 5 shows a crane 28 where the boom 36 is used as the sensor conductor with the current transformer 32 mounted to the boom. In FIG. 6, the alarm system 10 for crane 28 utilizes the load cable 40 as the sensor conductor with the current transformer 32 mounted thereto. As will be apparent, the best configuration for the alarm system 10 will depend on the details of the configuration of the equipment 12, but since a component of the sensor 16 of the system can include a portion of the equipment 12 itself, retrofitting can be relatively simple and inexpensive.

Figure 7:
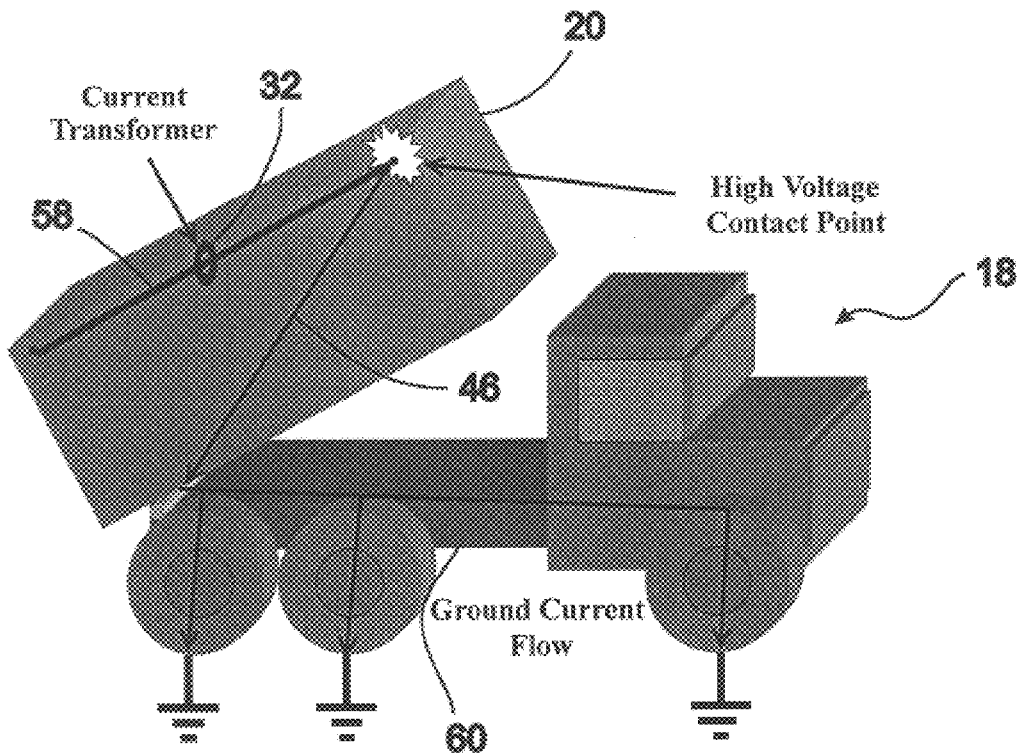
FIG. 7 is a schematic view of a truck with a pivoting bed and the sensor cable attached to the bed and extending therealong.

FIG. 7 depicts the dump truck 18 showing its rear bed 20 pivoted up relative to frame 60 of the truck 18. In this position, the high point of the bed 20 is exposed to high voltage such as by engagement with a power transmission line 22 with current flows 46 through the bed 20 and the truck frame 60 and to ground being shown. In the FIG. 7 arrangement, the alarm system 10 has the cable 58 attached at its ends to the front and rear of the truck bed 20 so that it runs therealong with the current transformer 32 attached intermediate the length of the cable 58 so as to provide a path of least resistance for current flow therethrough. In this manner, a portion of the current in the bed 20 will flow through cable 58 and be detected by the sensor 32 for signaling of the alarm unit and generating alarm 15 to warn of potentially hazardous conditions at the truck 18.

In FIG. 8, the alarm system is arranged so that the conductor 30 spans a moving joint with the cable 58 having its ends welded to the bed 20 and the frame 60. Accordingly, the sensor conductor 30 is attached to surfaces of the truck 18 that move relative to each other in a manner similar to that of the alarm system 10 on crane 28 of FIGS. 4A and 4B. The precise locations and portions of the vehicle 12 to which the conductor 30 is attached can vary widely so as to provide significant flexibility in use of the present system 10. In all cases, however, it is the presence of outside electrical power at the equipment 12 that is being detected so as to provide a reliable indication of an actual dangerous condition thereat.

While in the foregoing, there have been set forth preferred embodiments of the invention, it will be appreciated by those skilled in the art that the details herein given may be varied without departing from the true spirit and scope of the appended claims.

What is claimed is:

1. A method for detecting potential electrocution hazards on equipment of conductive material in the vicinity of an above-ground power transmission line, the method comprising:

equipment generating a signal only in response to current flow through the equipment due to the equipment contacting the power transmission line; and activating an alarm in response to the signal to warn individuals that outside electrical power is present on the equipment;

wherein the act of generating a signal comprises:

generating a current path between first and second locations on the equipment when the power transmission line contacts and transmits electrical power to the equipment;

sensing current flowing through the current path; and generating a signal in response to the sensed current;

wherein the current path is defined by a conductor electrically connected to the equipment at the first and second locations.

2. The method of claim 1, wherein current is sensed with an inductive sensor electrically coupled to the conductor.

3. A method for installing an alarm system on equipment of conductive material for use in detecting the presence of outside electrical power on the equipment, the alarm system comprising a conductor and a sensor mechanism for current flow in the conductor, the method comprising:

connecting a first end of the conductor to the equipment at a first location spaced from electrical ground; and connecting a second end of the conductor to the equipment at a second location spaced from electrical ground such that when outside electrical power is transmitted to the equipment, a current path is established between the first and second locations via the conductor.

4. The method of claim 3, wherein the first end of the conductor is connected to a first portion of the equipment at the first location and the second end of the conductor is connected to a second portion of the equipment at the second location, the first portion being moveable relative to the second portion.

5. The method of claim 3, wherein the first portion is adapted for pivoting movement relative to the second portion.

6. The method of claim 5, wherein the equipment comprises a vehicle having a crane, and the first portion comprises a portion of the crane and the second portion comprises a portion of the vehicle on which the crane is mounted for pivoting movement relative thereto.

7. An alarm system for use with equipment of conductive material through which current can flow when outside electrical power is transmitted thereto, the system comprising:

a sensor for generating a signal in response to the presence of outside electrical power at the equipment due to current flow on the equipment; and an alarm unit for receiving the signal and providing one of a visual and audio indication that electrical power is present;

wherein the sensor includes a conductor electrically connected to the equipment at spaced apart first and second locations spaced from electrical ground, and the signal is generated by the sensor in response to current flowing through the conductor between the first and second locations.

8. The alarm system of claim 7 wherein the signal is generated by the sensor if the current flowing through the conductor exceeds a predetermined amount of current.

9. The alarm system of claim 7 wherein the conductor establishes a path of low resistance between the first and second locations to direct the current therethrough.

10. The alarm system of claim 7 wherein the sensor is an inductive sensor and the conductor is attached to the equipment with the inductive sensor detecting current flow through the conductor corresponding to the presence of a threshold level of current through the equipment.

11. The alarm system of claim 7 wherein the sensor is an inductive sensor to electrically isolate the high levels of power at the equipment therefrom and for ensuring the signal is generated despite the presence of the high power levels.

12. The alarm system of claim 7 wherein the alarm unit produces both the visual and the audio indications.

13. The alarm system of claim 7 wherein the conductor is attached to a first portion of the equipment at the first location and a second portion of the equipment at the second location, the first and second portions being adapted to move relative to each other.

14. The alarm system of claim 7 including conditioning circuitry which processes the signal from the sensor so that the signal triggers the alarm unit for providing the indication.

15. The alarm system of claim 7 in combination with the equipment wherein the equipment comprises a mobile vehicle having moving portions thereof that can engage overhead power lines for transmitting power to the portion of the vehicle in engagement therewith and through other portions of the vehicle.

16. The combination of claim 15 wherein the conductor is attached to two portions of the vehicle that move relative to each other.

17. An alarm system for use with equipment of conductive material through which current can flow when outside electrical power is transmitted thereto, the system comprising:

a sensor comprising a conductor electrically connected to the equipment at first and second locations spaced from electrical ground such that when outside electrical power is transmitted to the equipment, the sensor senses current flowing through the conductor and generates a signal in response to the sensed current.

18. The alarm system of claim 17, wherein the conductor has first and second ends, the first end electrically connected to the equipment at the first location and the second end electrically connected to the equipment at the second location.

19. The alarm system of claim 18, wherein the conductor comprises a cable having first and second ends, the first end connected to the equipment at the first location and the second end connected to the equipment at the second location.

20. The alarm system of claim 17, wherein the conductor is electrically connected to a first portion of the equipment at the first location and to a second portion of the equipment at the second location, the first and second portions being adapted to move relative to each other.

21. The alarm system of claim 20, wherein the first portion of the equipment is adapted for pivoting movement relative to the second portion.

22. The alarm system of claim 21, wherein the equipment comprises a vehicle having a crane, and the first portion comprises a portion of the crane and the second portion comprises a portion of the vehicle on which the crane is mounted for pivoting movement relative thereto.

23. The alarm system of claim 17, wherein the sensor comprises an inductive sensor positioned to sense current flowing through the conductor.

24. The alarm system of claim 17, wherein the sensor generates a signal when the sensed current exceeds a predetermined level.

25. The alarm system of claim 17, further comprising an alarm for receiving the signal from the sensor and providing one of a visual and audio indication that electrical power is present.

26. An alarm system for sue with equipment of conductive material through which current can flow when electrical power is transmitted thereto, the equipment having a first portion and a second portion, the first portion being adapted for pivoting movement relative to the second portion, the system comprising:

a conductor electrically connected at spaced apart regions to the first and second portions of the equipment, wherein the first and second portions are spaced from electrical ground;

a sensor mechanism coupled to the conductor, the sensor mechanism being operable to generate a signal in response to current flow through the conductor due to outside electrical power transmitted to the equipment; and an alarm for receiving the signal and providing one of a visual and audio indication that electrical power is present.

27. The alarm system of claim 26, wherein the first portion of the equipment is adapted for pivoting movement relative to the second portion.

28. The alarm system of claim 27, wherein the equipment comprises a vehicle having a crane, and the first portion comprises a portion of the crane and the second portion comprises a portion of the vehicle on which the crane is mounted for pivoting movement relative thereto.

29. The alarm system of claim 26, wherein the sensor mechanism is inductively coupled to the conductor.

30. The alarm system of claim 26, wherein the conductor comprises a cable connected at opposite ends to the first and second portions of the equipment.

* * * * *

UNITED STATES PATENT AND TRADEMARK OFFICE
CERTIFICATE OF CORRECTION

PATENT NO. : 6,600,426 B1
DATED : July 29, 2003
INVENTOR(S) : Sacks et al.

It is certified that error appears in the above-identified patent and that said Letters Patent is hereby corrected as shown below:

Title page,
Item [73], Assignee, should read -- The United States of America as represented by the Department of Health and Human Services, Centers for Disease Control and Prevention, Atlanta, GA (US) --.

Column 2,
Line 59, "retrofit" should be -- retrofitted --.
Line 62, "is schematic" should read -- is a schematic --.

Column 6,
Line 17, "equipment" should be deleted.

Signed and Sealed this

Twenty-second Day of June, 2004

JON W. DUDAS
*Acting Director of the United States Patent and Trademark Office*